No. 692,795. Patented Feb. 4, 1902.
L. MOYLE.
HOSE OR PIPE COUPLING.
(Application filed Mar. 25, 1901.)
(No Model.)
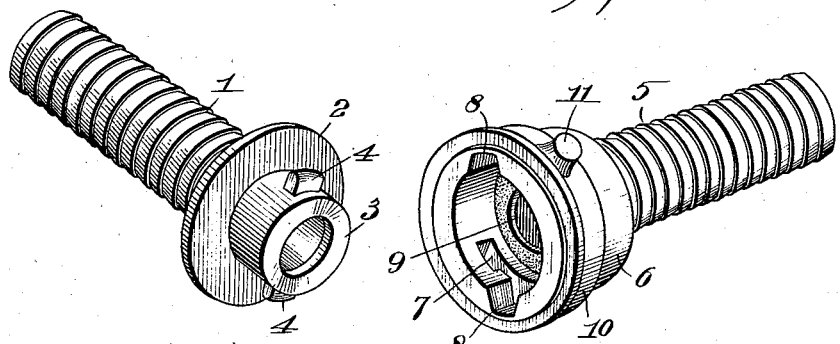
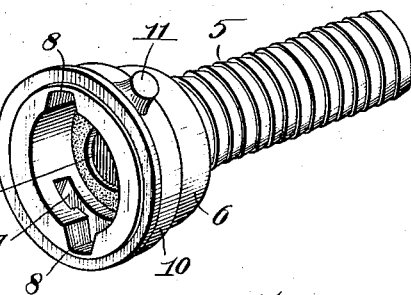
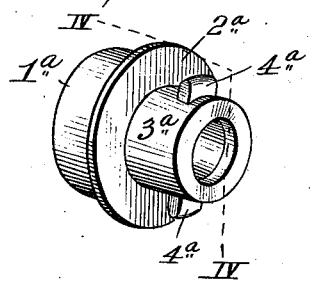
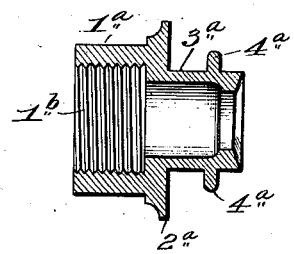
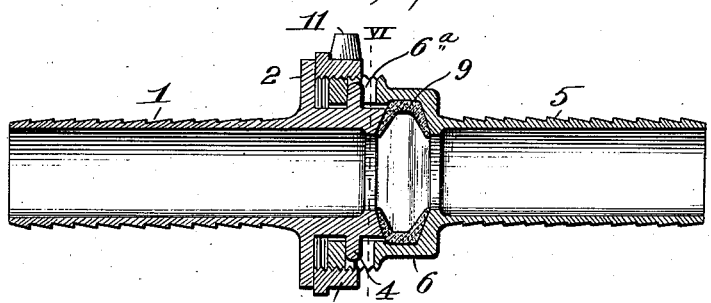
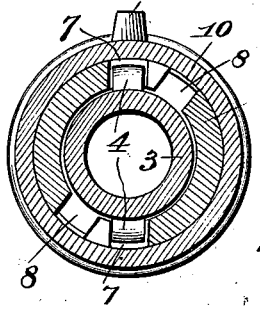
Attest:
W. P. Smith
E. S. Knight
Inventor:—
Leigh Moyle.
By Wright Bro.
atty's

UNITED STATES PATENT OFFICE.

LEIGH MOYLE, OF ST. LOUIS, MISSOURI, ASSIGNOR, BY MESNE ASSIGNMENTS, TO HANDLAN-BUCK MANUFACTURING COMPANY, OF ST. LOUIS, MISSOURI, A CORPORATION.

HOSE OR PIPE COUPLING.

SPECIFICATION forming part of Letters Patent No. 692,795, dated February 4, 1902.

Application filed March 25, 1901. Serial No. 52,689. (No model.)

*To all whom it may concern:*

Be it known that I, LEIGH MOYLE, a citizen of the United States, residing in the city of St. Louis, in the State of Missouri, have invented certain new and useful Improvements in Hose or Pipe Couplings, of which the following is a full, clear, and exact description, reference being had to the accompanying drawings, forming part of this specification.

My invention relates to that class of couplings utilized to join the meeting ends of sections of hose or pipe; and the invention has particular reference to means whereby the coupling members are held from separation after they are locked together.

The invention consists in features of novelty hereinafter fully described, and pointed out in the claim.

Figure I is a perspective view of the male member of the coupling. Fig. II is a perspective view of the female member. Fig. III is a perspective view of the male member of the form used for connection to pipes. Fig. IV is a sectional view taken on line IV IV, Fig. III. Fig. V is a longitudinal sectional view taken through the coupling in assembled condition. Fig. VI is an enlarged cross-sectional view taken on line VI VI, Fig. V.

1 designates the male member of the coupling, which is provided with an annular rim 2 and a neck 3. Projecting from the body 3 are ears 4. The member 1 may be of the form shown in Fig. I, rendering it adaptable for the attachment of hose thereto, or it may be of the form shown in Figs. III and IV, in which $1^a$ designates the male member, $2^a$ the annular rim, $3^a$ the body, and $4^a$ the ears, the form shown in Figs. III and IV being provided with an interior screw-thread $1^b$, by which the member is connected to a threaded pipe.

5 designates the neck of the female member of the coupling, the said member being provided with a socket-body 6, formed integral with the neck of the member, thereby greatly simplifying the construction of the member and decreasing the cost thereof over a construction wherein the female member is composed of two or more parts. The socket-body 6 contains interiorly-arranged bayonet-slots 7, having entrance-mouths 8 for the reception of the ears 4 or $4^a$, that are inserted therein and turned into the bayonet-slots to lock the coupling members together. Within the socket-body 6 is a gasket 9. (See Figs. II and V.) The exterior of the socket-body 6 is provided with a screw-thread $6^a$. (See Fig. V.)

10 designates a ring that is provided interiorly with a screw-thread corresponding to the screw-thread $6^a$ of the body 6, the said ring being adapted for longitudinal rotation on the body 6, so that it may be moved to and fro thereon longitudinally of the said body and the female member 5 in order to cause it to approach or recede from the annular rim 2 of the male member 1 or $1^a$. When the two members 1 or $1^a$ and 5 of the coupling are to be assembled together, the ring 10 is placed in a receded position on the body 6, and the members are then brought together and interlocked by the ears 4 or $4^a$ of the male member entering into the bayonet-slots 7 of the female member, so as to connect the two parts of the coupling. In this connection the parts are brought together and assembled in the same manner as they would be in the absence of the ring 10. After the coupling members are assembled the ring 10 is turned forwardly on the socket-body 6 by hand or any suitable implement, the said ring being preferably provided with a lug 11 for the reception of a suitable implement that may be applied thereto to rotate the ring. On rotating the ring it is moved forwardly, as stated, until it is brought to the annular rim 2 or $2^a$ of the male member of the coupling. It will be seen that the annular rim 2 or $2^a$ is of greater diameter than the socket-body 6 of the female member and that consequently when the ring 10 is moved forwardly on the socket-body the said ring is brought to a stop against the said annular rim instead of being permitted to pass thereover and must abut thereagainst. By abutting against the rim 2 or $2^a$, carried by the male member, the ring 10, which is carried by the female member, as described, prevents approach of the two members toward each other after they have been interlocked by engagement of the ears in the bayonet-slots carried by the respective members. By this means the separation of the coupling is rendered impossible after the ring has been moved into contact with the rim carried by the male member.

I claim as my invention—

A coupling of the class described, comprising a member provided with projections and an annular rim, a member externally threaded and provided with bayonet-slots, and an internally-threaded ring mounted on the externally-threaded member and adapted to be brought into contact with the annular rim to hold the projections on one member seated in the locking-recesses of the bayonet-slots in the other member.

LEIGH MOYLE.

In presence of—
 E. S. KNIGHT,
 N. V. ALEXANDER.